United States Patent [19]

Schoenthal et al.

[11] Patent Number: 4,579,729

[45] Date of Patent: Apr. 1, 1986

[54] WIDE PORE ALUMINA SUPPORTS

[75] Inventors: Galeon W. Schoenthal, Houston; Lynn H. Slaugh, Cypress, both of Tex.

[73] Assignee: Shell Oil Company, Houston, Tex.

[21] Appl. No.: 751,778

[22] Filed: Jul. 5, 1985

[51] Int. Cl.$^4$ ............................................. C01F 7/02
[52] U.S. Cl. .................................. 423/626; 423/628; 423/630; 423/631
[58] Field of Search ................ 423/626, 628, 630, 631

[56] References Cited

U.S. PATENT DOCUMENTS

| | | | |
|---|---|---|---|
| 3,850,849 | 11/1974 | Kiovsky et al. | 423/626 |
| 3,853,789 | 12/1974 | Waitchn et al. | 423/628 |
| 3,975,510 | 8/1976 | Leach et al. | 423/628 |
| 3,983,197 | 9/1976 | Mitsche et al. | 423/628 |
| 4,102,978 | 7/1978 | Kiovsky | 423/628 |
| 4,169,883 | 10/1979 | Murrell et al. | 423/628 |
| 4,293,448 | 10/1981 | Laurer | 423/628 |
| 4,301,033 | 11/1981 | Takumi et al. | 423/628 |
| 4,301,037 | 11/1981 | Sanchez et al. | 423/628 |

*Primary Examiner*—H. T. Carter

[57] ABSTRACT

High surface area, wide-pore-containing porous aluminas are prepared by mulling together aluminum nitrate derived hydrogels with sodium aluminate derived hydrogels, extruding, drying and calcining at 500°–700° C.

4 Claims, No Drawings

WIDE PORE ALUMINA SUPPORTS

FIELD OF THE INVENTION

This invention relates to a process for preparing high surface area, wide-pore-containing alumina materials useful as catalyst supports in the hydrotreating area.

BACKGROUND OF THE INVENTION

In certain petrochemical reactions the use of supported catalysts having most of their pores in diameters less than about 100 Å can present many problems. Diffusional limitations can occur when reactions take place in very small pores. Many petrochemical feedstocks contain various metal impurities such as nickel, vanadium or iron which can deposit out and poison small pore sized materials. Thus, catalysts having large average pore diameters, particularly catalysts having average pore diameters above about 100 Å, have been found to have greater metals capacity than catalysts having substantially only relatively small pores. Methods for creating controlled pore sizes in aluminas are hence quite useful. Various means have been utilized in the art to prepare supports with controlled pore sizes. Carbonaceous materials have been incorporated in aluminous material which, upon burn-out, produce selected pore sizes. Another means utilized has incorporated various fine solid particles, such as recycle catalyst fines into the processing of the alumina. Detergents have been added to hydrogels, which upon extrusion resulted in wide pores.

SUMMARY OF THE INVENTION

This invention relates to a process for preparing high-surface area, wide-pore-containing alumina supports which comprises mulling together two separately prepared hydrogels, extruding, drying, and calcining. The first hydrogel is prepared by precipitating an aqueous solution of aluminum nitrate with an aqueous solution of an alkali metal or ammonium carbonate or bicarbonate. A second hydrogel is prepared by precipitating an aqueous solution of sodium aluminate with an aqueous solution of a strong inorganic acid. The two hydrogels are co-mulled together in the presence of a peptizing agent. The amount of the first hydrogel (nitrate-derived) utilized in the mixture will be such that the molar percentage of alumina ($Al_2O_3$) will range from about 10 to about 30 percent of the total molar amount of alumina present in co-mulled mixture. Materials prepared in this fashion have high surface areas, greater than about 200 $m^2/g$; high crush strengths, greater than about 10 psi; and a substantial portion, greater than about 25 percent, of its pores in the range greater than about 350 Å. These materials are quite useful for preparing hydrotreating and hydrodemetallization catalysts. The instant invention then provides another means for tailor-making a catalyst (support) having both narrow and wide pores.

DESCRIPTION OF THE PREFERRED EMBODIMENTS

The instant invention utilizes the addition of minor amounts (less than 50% by weight) of an aluminum nitrate derived alumina hydrogel to a hydrogel derived from sodium aluminate, which, upon calcining results in a high surface alumina catalyst (support) having a significant portion of its pores in the 350 Å and greater range in addition to the pores that would have been present in the 50–125 Å range had not the nitrate-derived gel been utilized.

The alumina hydrogel prepared from the sodium aluminate is prepared in a routine fashion. This basically comprises precipitating an aqueous solution of sodium aluminate with a strong inorganic acid such as, for example, sulfuric acid, nitric acid, or hydrochloric acid. The precipitation can be carried out by adding an aqueous solution of sodium aluminate to a solution containing a strong acid until a pH of about 7.5 to 8.5 is reached in the reacting medium, or the procedure can be reversed by adding the strong acid to the solution containing the sodium aluminate until a pH of about 7.5 to 8.5 is obtained (referred to as "sequential precipitation"). Preferably, the precipitation is obtained by simultaneously mixing the aqueous solution of sodium aluminate and the aqueous acid solution in a separate container at a pH of about 7.5 to 8.5 (referred to as "simultaneous precipitation"). The gel is frequently aged after precipitation, say at a pH ranging from about 9.5 to 10.5 for about 0.1 to about 10 hours. After precipitation, the gel is washed to remove most of the by-products salts. After the washing, the gel is partically dried, but not to the extent that the gel structure is completed destroyed.

The nitrate-derived alumina hydrogel to be admixed with the sodium aluminate-derived alumina hydrogel is prepared by precipitating an aqueous solution of aluminum nitrate with an aqueous solution of an alkali metal or ammonium carbonate or bicarbonate. The precipitation can be carried out by adding an aqueous solution of the alkali metal or ammonium carbonate or bicarbonate to an aqueous solution of the aluminate nitrate salt until a pH of about 6 to about 8 is reached in the precipitating medium, or the procedure can be reversed by adding the solution of the aluminum nitrate salt to the solution of the alkali metal or ammonium carbonate or bicarbonate salt until a pH of about 6 to about 8 is obtained (referred to as "sequential precipitation"). Preferably, the precipiation is obtained by simultaneously mixing the aluminum nitrate solution and the alkali metal or ammonium carbonate/bicarbonate solution in a separate container at a pH of about 6 to about 8 (referred to as "simultaneous precipitation"). The gel is frequently aged after precipitation, say at a pH of about 6 to 8 and for a time of about 0.1 to about 10 hours. After precipitation, the gel is washed to remove most of the by-products salts. The gel may be partially dried, but not to the extent that the gel structure is completely destroyed.

After preparation of the individual gels, from about 10 to about 30 percent by weight of the nitrate-derived gel is added to the sodium aluminate-derived gel and the two gels are mulled together in the presence of a peptizing agent for a sufficient period of time to obtain a homogeneous mixture. Times of mulling will be dependent upon the type and efficiency of the mulling apparatus. Times ranging from about 0.1 to about 10 hours are generally suitable. Suitable peptizing agents utilized are acids, such as acetic acid or nitric acid, and are added in an amount to adjust the pH of mixture between about 3 to 6.5. The water content of the mulled mixture should be set as to provide an extrudable mix. This can be accomplished in several means. It can be accomplished by precisely adjusting the water contents of the individual gels prior to mixing. If the water content of the individual gels is not correct to provide the desired extrudable mix, then the water content of the mulled mixture can be adjusted by adding water during the mulling process, or by removing water during the mulling process by suitable application of vacuum. After mulling, the mixture is extruded, dried and calcined. Drying temperatures are not critical and are typically about 50°–150° C. Drying times depend on drying temperatures and typically range from about 1 to about 30 hours. Drying atmosphere is not critical. Frequently, drying is combined with a calcining step. Calcining is carried out at temperatures ranging from about 500° to up to about 700° C. Calcining times are dependent on calcining temperatures and will typically range from about ½ to about 20 hours. Calcining atmosphere is not critical; although, if organic binders and/or lubricants are utilized to facilitate extrusion, calcining should be carried out in an oxidizing atmosphere. Air is a preferred calcining atmosphere.

The calcined materials are found to have surface areas (BET) greater than about 200 m$^2$/g, pore volumes (mercury intrusion at 3000 psi) ranging from about 0.7 to about 1.3 cc/g and with at least 25 percent of their pore volume in pores having diameters greater than 350 Å. Pore diameters are also measured by mercury intrusion. Crush strengths (measured by flat plate crush test) are greater than about 10 lbs. A critical aspect of the instant invention is the amount of nitrate-derived alumina hydrogel that is added to the sodium aluminate-derived hydrogel. It has been found that the amount of aluminum nitrate-derived hydrogel to be added must fall within the range of about 10 percent to about 30 percent than by weight, basis alumina of the total final material. If lesser amounts of nitrate-derived gel are added to the sodium aluminate-derived gel, then the amount of pore volume found in pores greater than 350 Å drops significantly. If the amount of aluminum nitrate-derived gel added to the sodium aluminate-derived gel exceed about 30 percent, then the crush strength of the final sintered material falls significantly, considerably below 10 lbs.

The calcined alumina is most suitable for use as a catalyst in those processes catalyzed by alumina or for use as a catalyst support. It is particularly suitable as a support for preparing hydrotreating or hydrofining catalysts, for example, those utilizing Group VIIIB alone or in combination with Group VIB metals. Such catalysts can be suitably applied to hydrocarbon conversion processes such as catalytic cracking, hydrocracking, hydrotreating, reforming, isomerization, hydrogenation, dehydrogenation, oligomerization, alkylation, dealkylation, demetallization and the like.

The instant porous alumina materials, when utilized to support molybdenum, vanadium and cobalt as catalytically active metals, are very suitable for demetallization reaction involving crude feedstocks. The larger pores of the instant materials are not quickly plugged up by the depositing metals, and hence, provide very long life. In a typical demetallization reaction a crude feedstock is contacted with the instant catalyst at a temperature ranging from about 350° to 450° C. and at a pressure ranging from about 500 to about 5000 psi.

The process for preparing the porous aluminum oxide materials of the instant invention will be further described below by the following illustrative embodiments which are provided for illustration and which are not to be construed as limiting the invention.

EXAMPLE 1

Aluminate Nitrate-Derived Gel

The alumina nitrate-derived hydrogel was prepared by pumping two solutions into a stirred reaction vessel at ambient temperature. One solution was 375 g (1 mole) of aluminum nitrate in 400 ml of water and the other solution was two molar ammonium carbonate. The addition time of 13 minutes at a constant pH of 7 was followed by a ageing step of 30 minutes at the same pH. The precipitate was filtered and washed with a total of 6 liters of water. The gel was then divided into equal portions and one portion was dried at 90° C. to a weight of 48 g.

Sodium Aluminate-Derived Gel

The sodium aluminate-derived hydrogel was prepared by pumping two solutions into a stirred reaction vessel containing 750 ml of water at 65° C. One solution was prepared by dissolving 440 g (two moles) of sodium aluminate in 1100 ml of water containing 11 g of sodium hydroxide at ambient temperature and heating it to 65° C. The other solution was a one molar solution of sulphuric acid at 65° C. The addition time was 20 minutes at a constant pH of 8, followed by a ageing step at a pH of 10 for about 15 minutes. The adjustment in pH was done with 2 molar sodium hydroxide. The precipitate was filtered and washed with a total of 12 liters of water. This gel was divided into equal portions and one was dried at 90° C. to 266 g.

Mixed Gel Preparation

The 48 g sample of the nitrate-derived gel was combined with the 266 g sample of the aluminate-derived gel in a "Brabender Prep Mixer" and mixed for 30 minutes with 2 ml of acetic acid. The calculated loss on ignition was 62%. The material that was extruded through a die with 1/16" holes and dried in an oven overnight at 120° C. The extrudate was broken into short lengths with a roller and sieved to remove fines. The material was calcined at 600° C. for 6 hours. The crush strength by flat plate crush test was about 11.6 lbs. The physical characteristics of this material are given in Table I.

COMPARATIVE EXAMPLE A

In this example the other sample of the sodium aluminate derived gel was extruded and calcined as described above. The crush stength by flat plate crushed test was about 20 lbs. Physical properties are given in Table I.

COMPARATIVE EXAMPLE B

In this example the aluminum nitrate derived gel sample from above was extruded and calcined as described in the preparation of the mixed gel material. Crush strength by flat plate crushed test was less than 6 hours. Physical properties are given in Table I.

TABLE I

| Example | Surface Area m$^2$/g | Pore Vol. ml/g | Pore Size Distribution, Å | | | | | |
|---|---|---|---|---|---|---|---|---|
| | | | <50 | 50–70 | 70–100 | 100–125 | 125–350> | 350 |
| 1 | 288 | 0.99 | 10.1 | 29.5 | 18.5 | 5.1 | 4.5 | 32.3 |
| A | 237 | 0.74 | 2.9 | 13.4 | 53.4 | 23.3 | 3.1 | 4.0 |
| B | 172 | 1.0 | 5.4 | 3.3 | 2.8 | 4.9 | 34.5 | 49.0 |

We claim:

1. A process for preparing a high surface area, wide-pore-containing, porous alumina material which comprises:
(a) preparing a first alumina hydrogel by precipitating an aqueous solution of aluminum nitrate with an aqueous solution of an alkali metal or ammonium carbonate or bicarbonate, then washing and partially drying said first hydrogel, (b) separately preparing a second alumina hydrogel by precipitating an aqueous solution of sodium aluminate with an aqueous solution of a strong inorganic acid, then washing and partially drying said second hydrogel, (c) co-mulling the washed and dried first and second hydrogels in the presence of a peptizing agent, wherein the weight percentage of the alumina provided by the first hydrogel ranges from about 10 to about 30 percent by weight, basis alumina ($Al_2O_3$), of the total and, adjusting, as needed the water content of the mulled material to provide an extrudable mixture, (d) extruding the product of (c), (e) drying the product of (d), and (f) calcining the product of (e) at a temperature ranging from about 500° to about 700° C.

2. The process of claim 1, wherein the precipitation of step (a) is carried out using ammonium carbonate and the precipitation of step (b) is carried out using sulfuric acid.

3. The process of claim 1, wherein the peptizing agent aged in step (c) is acetic acid.

4. The process of claim 1, wherein the precipitation of steps (a) and (b) are individually by simultaneous precipitation.

* * * * *